United States Patent [19]
Bates

[11] Patent Number: 5,681,242
[45] Date of Patent: Oct. 28, 1997

[54] SELECTABLE ENHANCED CREEP CONTROL MODE FOR AUTOMATED CLUTCH AND VEHICULAR AUTOMATED MECHANICAL TRANSMISSION SYSTEM UTILIZING SAME

[75] Inventor: Ian Richard Joseph Bates, Huddersfield, England

[73] Assignee: Eaton Corporation, Cleveland, Ohio

[21] Appl. No.: 614,168

[22] Filed: Mar. 8, 1996

[30] Foreign Application Priority Data

Mar. 8, 1996 [GB] United Kingdom ............... 9504681

[51] Int. Cl.$^6$ ................................................. B60K 91/02
[52] U.S. Cl. .................. 477/180; 477/176; 477/181; 192/103 R
[58] Field of Search ......................... 477/174, 176, 477/180, 181, 70, 83, 122; 192/103 R, 3.51

[56] References Cited

U.S. PATENT DOCUMENTS

| | | | |
|---|---|---|---|
| 4,081,065 | 3/1978 | Smyth et al. | 192/0.076 |
| 4,361,060 | 11/1982 | Smyth | 74/866 |
| 4,790,420 | 12/1988 | Hata et al. | 192/70.25 |
| 5,067,599 | 11/1991 | Röder et al. | 477/176 |
| 5,097,724 | 3/1992 | Braun | 74/866 |
| 5,275,267 | 1/1994 | Slicker | 192/0.033 |
| 5,293,316 | 3/1994 | Slicker | 364/424.1 |
| 5,314,050 | 5/1994 | Slicker et al. | 477/171 |
| 5,316,116 | 5/1994 | Slicker et al. | 477/181 |
| 5,378,211 | 1/1995 | Slicker et al. | 477/175 |

*Primary Examiner*—Charles A. Marmor
*Assistant Examiner*—Sherry Lynn Estremsky
*Attorney, Agent, or Firm*—Howard D. Gordon

[57] ABSTRACT

A control for a vehicular automated clutch (14) drivingly interposed between a fuel-controlled engine (12) and a multiple-speed, change-gear transmission (16) providing enhanced low-speed maneuvering control is provided. Upon manual selection (40) of creep mode, an enhanced creep mode is activated, effective over a relatively large range (0% to 75%) of throttle pedal (32) displacement.

26 Claims, 7 Drawing Sheets

| FUEL LOGIC STATE | CONTROL SIGNAL |
|---|---|
| TOUCH POINT | ZERO |
| DIRECT | EQUAL TO THL |
| LAUNCH | RAMP TO HOLD AT % THL |
| RAMP | RAMP TO THL |
| EXTENDED DIRECT | EQUAL TO THL/THL$_{REF}$ |

FIG. 5B

SELECTABLE ENHANCED CREEP CONTROL MODE FOR AUTOMATED CLUTCH AND VEHICULAR AUTOMATED MECHANICAL TRANSMISSION SYSTEM UTILIZING SAME

BACKGROUND OF THE INVENTION

RELATED APPLICATIONS

This application is related to and claims priority from British Pat. App. No. 9504681.9 filed Mar. 8, 1995, and assigned to Eaton Corporation, the assignee of this application.

1. Field of the Invention

The present invention relates to controls for automatic clutches associated with vehicular drivetrains and, in particular, to controls for enhanced slow-speed operation of vehicles provided with automatic clutches and/or automated mechanical transmission systems incorporating automatic clutches.

More particularly, the present invention relates to a manually selectable, enhanced creep mode of clutch control, selectable as a "pseudo gear ratio," wherein the lowest gear ratio is engaged and the clutch will be controlled and the vehicle engine fueled over a relatively small portion of the total operating ranges thereof (i.e., engine fueled from 0% to 25% of maximum fueling and clutch slip 100% to 0%), depending proportionally upon throttle position over a relatively large portion of throttle pedal displacement (i.e., such as from 0% to about 75% or greater throttle displacement).

2. Description of the Prior Art

Vehicular automated master friction clutches, including automated clutches providing start-from-stop operation, and automated mechanical transmission systems utilizing same are well known in the prior art, as may be seen by reference to U.S. Pat. Nos. 4,081,065; 4,361,060; 4,595,986; 4,646,891; 4,638,898; 4,648,290; 4,711,141; 4,714,144; 4,898,858 and 5,409,432, the disclosures of which are incorporated herein by reference. Such systems, when utilized in heavy-duty vehicles such as trucks, tractor-semitrailers and buses, typically include compound mechanical transmissions having 9, 1 0, 12, 13, 16, 18 or more forward ratios of the types illustrated in U.S. Pat. Nos. 5,390,561; 4,735,109 and 4,754,665, the disclosures of which are incorporated herein by reference.

To provide some degree of low-speed maneuverability, during vehicle start-from-stop operations, automated clutch control systems typically operated in either a launch mode (if throttle displacement was greater than a relatively low reference value, typically 20% to 30% of full throttle displacement) or in a creep mode (if throttle pedal displacement was less than the reference value). Systems of this type may be seen by reference to U.S. Pat. Nos. 5,097,724; 5,275,267; 5,293,316; 5,314,050; 5,316,116 and 5,378,211, the disclosures of which are incorporated herein by reference.

In certain situations, the amount of throttle pedal travel (0% to 25% of full pedal travel) available in the creep mode of control did not provide the desired level of control. To provide even greater control of low-speed maneuvering of vehicles equipped with automatic clutches, even in vehicles having a creep mode of clutch control, such as is desirable when operating in confined spaces, pulling up to loading docks, backing under semitrailers or the like, it often was necessary to equip the transmission with one or more "deep reduction" or "creep" ratios having a relatively high reduction ratio (i.e., such as about 12:1 to 15:1).

SUMMARY OF THE INVENTION

In accordance with the present invention, the drawbacks of the prior art are minimized or overcome by the provision of an automated clutch control providing the driver excellent low-speed vehicle maneuvering control without requiring the provision of a deep reduction or creep ratio.

The foregoing is accomplished by providing for the manual selection of a pseudo creep ratio which will cause operation in the lowest available transmission ratio and will cause an expanded or enhanced creep control mode of clutch control to become effective. In the enhanced creep mode, creep controls are effective over an expanded range of throttle pedal positions, such as from about 0% to about 75% throttle displacement, to provide easier control of low-speed vehicle operation. In the enhanced creep mode of operation, fueling of the engine ranges from 0% (idle) to about 25% of maximum fueling, and clutch slip will vary from about 100% to about 0%, both varying substantially proportionally with increased throttle displacement over the expanded range.

Accordingly, it is an object of the present invention to provide an improved control for automatic clutches and vehicular automated mechanical transmission systems utilizing same.

This and other objects and advantages of the present invention will become apparent from a reading of the following description of the preferred embodiment taken in connection with the attached drawings.

BRIEF DESCRIPTION OF THE DRAWINGS

FIG. 5B is a chart of the various fueling control states.

DESCRIPTION OF THE PREFERRED EMBODIMENT

Figure 1:
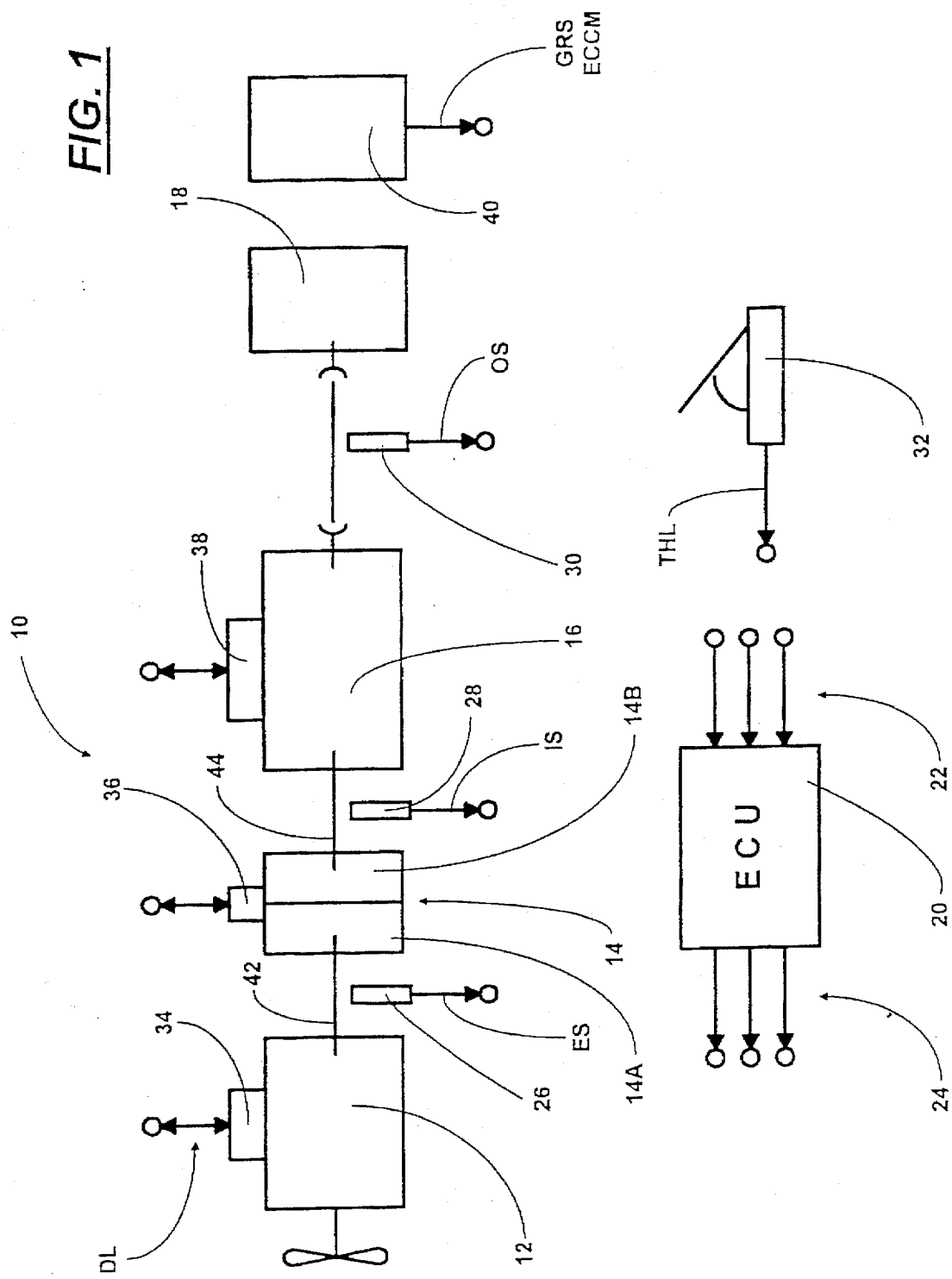
FIG. 1 is a schematic illustration of a vehicular automated mechanical transmission system utilizing the selectable enhanced creep control mode for automated clutch control of the present invention.

A schematic illustration of a vehicular automated mechanical transmission system 10 utilizing the low-speed vehicle maneuvering clutch control mode of the present invention may be seen by reference to FIG. 1. Automated transmission systems of this general type may be seen in greater detail by reference to aforementioned U.S. Pat. Nos. 3,361,060; 4,595,986; 4,648,290 and 5,409,432.

Automated mechanical transmission system 10 includes a fuel-controlled, internal combustion engine 12 (such as a well-known diesel engine), a normally engaged, selectively disengaged master friction clutch 14, a multiple-speed mechanical transmission 16, and a drive axle assembly 18 of the type illustrated in U.S. Pat. Nos. 4,862,025; 4,818,035 and 4,050,534, the disclosures of which are incorporated herein by reference.

A microprocessor-based electronic control unit (ECU) 20 receives input signals 22 and processes same in accordance with programmed logic rules to issue command output signals 24. The input signals 22 typically include signals from a sensor 26 indicative of engine speed (ES), from sensor 28 indicative of transmission input shaft speed (IS), from sensor 30 indicative of transmission output shaft speed (OS), and from sensor 32 indicative of throttle pedal position (THL). The command output signals typically will control an engine fuel control actuator 34, a clutch actuator 36, and a transmission actuator 38. Transmission actuator 38 may be of the type illustrated in U.S. Pat. Nos. 4,873,881 and/or 4,899,607, the disclosures of which are incorporated herein by reference. Preferably, the actuators also will provide feedback input signals to the ECU 20 indicative of the operation of the devices controlled thereby. Engaged transmission ratio (GR) may be determined from a feedback signal from actuator 38 and/or by calculation from input and output shaft speeds (i.e., GR=IS/OS). Alternatively and/or in addition to the illustrated sensors, the vehicle may be provided with an electronic data link (DL) of the type defined in an industry standard protocol such as SAE J1922, SAE J1939 and/or ISO 11898.

The ECU 20 also will receive signals from an operator-controlled shift selector device 40 indicative of the desired mode of transmission operation and/or the specific desired gear ratio (GRS). As will be described in greater detail below, in accordance with the present invention, the selector 40 also will allow the vehicle operator to select operation in an enhanced creep control mode of operation, preferably selectable as a "pseudo creep ratio" (ECCM), wherein vehicle maneuverability at low speeds will be greatly enhanced.

Figure 2:
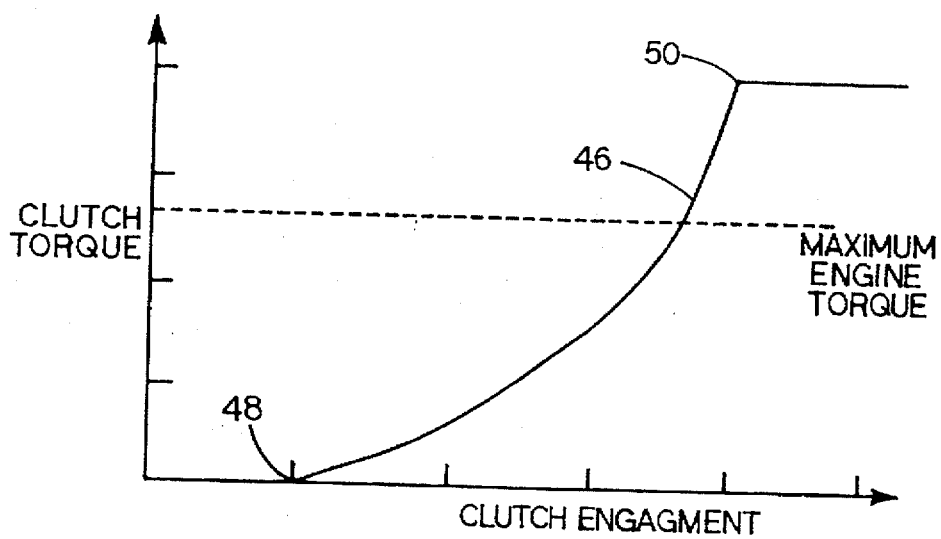
FIG. 2 is a curve of clutch torque as a function of clutch position.

The friction clutch 14 typically will include one or more driving plates 14A driven by the engine crankshaft 42, and one or more driven plates 14B drivingly connected to the transmission input shaft 44. The clutch plates 14A and 14B may be fully disengaged, fully engaged or partially engaged, as is well known in the prior art. Friction clutch 14 couples torque from the engine crankshaft 42 to the transmission input shaft 44 corresponding to the degree of engagement between the plates 14A and 14B. A typical torque-versus-clutch-position function curve is illustrated in FIG. 2. Clutch torque/position curve 46 is initially zero for a range of engagement before initial touch point 48. Clutch torque rises monotonically with increasing clutch engagement. In the example illustrated in FIG. 2, clutch torque rises slowly at first and then more steeply until maximum clutch torque is reached upon full engagement at point 50. In a typical vehicular application, the clutch design calls for maximum clutch torque upon full engagement to be about 1.5 times the maximum engine torque. This insures that the clutch 14 can transfer the maximum torque produced by engine 12 without slipping.

Clutch actuator 36 may be operatively coupled to a movable one of the clutch plates for control of the clutch 14 from full disengagement through partial engagement to full engagement. In a typical vehicular application, clutch actuator 36 may be electrical, hydraulic, mechanical, pneumatic, or some combination thereof, and typically is position- or pressure-controlled. Clutch actuator 36 controls the degree of clutch engagement according to a clutch engagement signal from the ECU 20 and preferably is a closed-loop-type device providing feedback signals to the ECU 20.

Figure 3:
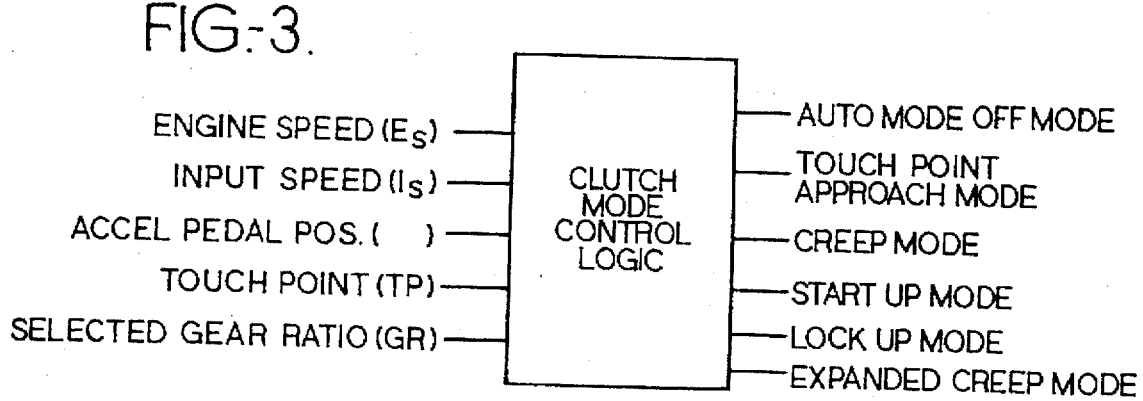
FIG. 3 is diagram of a clutch control logic block showing the inputs and outputs.

FIG. 3 is a diagram showing the inputs and outputs of the clutch mode control logic of ECU 20, which establishes clutch control modes according to engine and transmission operating conditions which are used in control of the clutch actuation and also is used in the operation of the throttle filter logic. The inputs to the clutch mode control logic are signals representing engine speed (ES) from sensor 26 or the data link (DL), transmission input shaft speed (IS) from sensor 28, accelerator pedal position (THL) from sensor 32, a touch point signal (TP) produced when the clutch position reaches the predetermined touch or incipient engagement position, and a selected gear ratio signal indicative of operator selection of the enhanced creep mode. The clutch mode control logic output is one of the six modes set forth below.

Touch Point Approach Mode. In this mode, the clutch 14 is commanded to go to the touch point or point of incipient engagement.

Creep Mode. This mode is established when Enhanced Creep Mode has not been selected, the touch point is attained, and the throttle pedal position is above the minimum level (about 3%) but below a threshold level (about 25%). During Creep Mode, the clutch engagement is controlled to cause the input shaft speed (IS) to smoothly approach a percentage of the engine speed (ES), thereby causing the clutch slip to allow slow vehicle maneuvering. Typically, the input shaft speed is controlled to a creep speed reference signal ($R_{CRP}$) equaling $ES(T/T_{REF})$ where ES is measured engine speed, T is throttle position signal, and $T_{REF}$ is the reference constant equal to the throttle signal at the threshold value. In this mode, the engine control signal to the engine controller 34, controlling the amount of fueling for engine 12, will be equal to the pedal signal.

Launch Mode. This mode is activated when Enhanced Creep has not been selected and the pedal signal reaches or exceeds the Creep Mode threshold value (25%) or, if Enhanced Creep Mode is selected and the throttle pedal signal reaches or exceeds the Enhanced Creep Mode threshold value (75%), and is maintained so long as the pedal signal or engine speed remains high, but is terminated when clutch slip becomes small. In this mode (commonly referred to as the "start-up mode" or "start-up state"), the clutch is controlled to engage at a rate dependent upon engine speed to smoothly advance the input shaft speed to engine speed.

Lock-up mode. This mode normally is entered into from the "start-up" or Launch Mode when clutch slip becomes small. In this mode, the clutch control is signaled to fully engage the clutch. This mode typically terminates the throttle filter function, and the fuel control signal will equal the pedal signal.

Auto mode off. Auto Mode Off is active when there is no automatic operation of the clutch. Typically, the pedal signal will be at or near zero or engine speed will be near idle. No control signal is output during this condition, and the clutch is commanded to be fully disengaged.

The foregoing five modes of clutch control are known in the prior art and may be appreciated in greater detail by reference to aforementioned U.S. Pat. Nos. 5,314,050 and 5,293,316.

Figure 7:
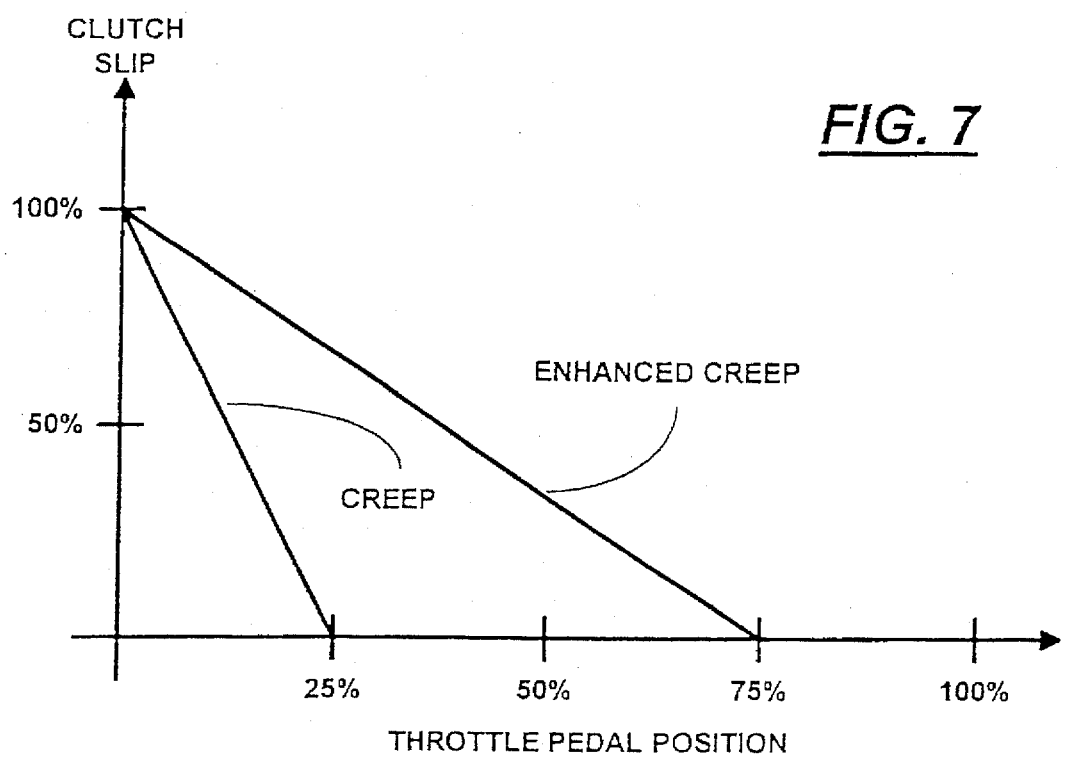
FIG. 7 is a graphic illustration of clutch slip in the creep and enhanced creep control modes.
Figure 8:
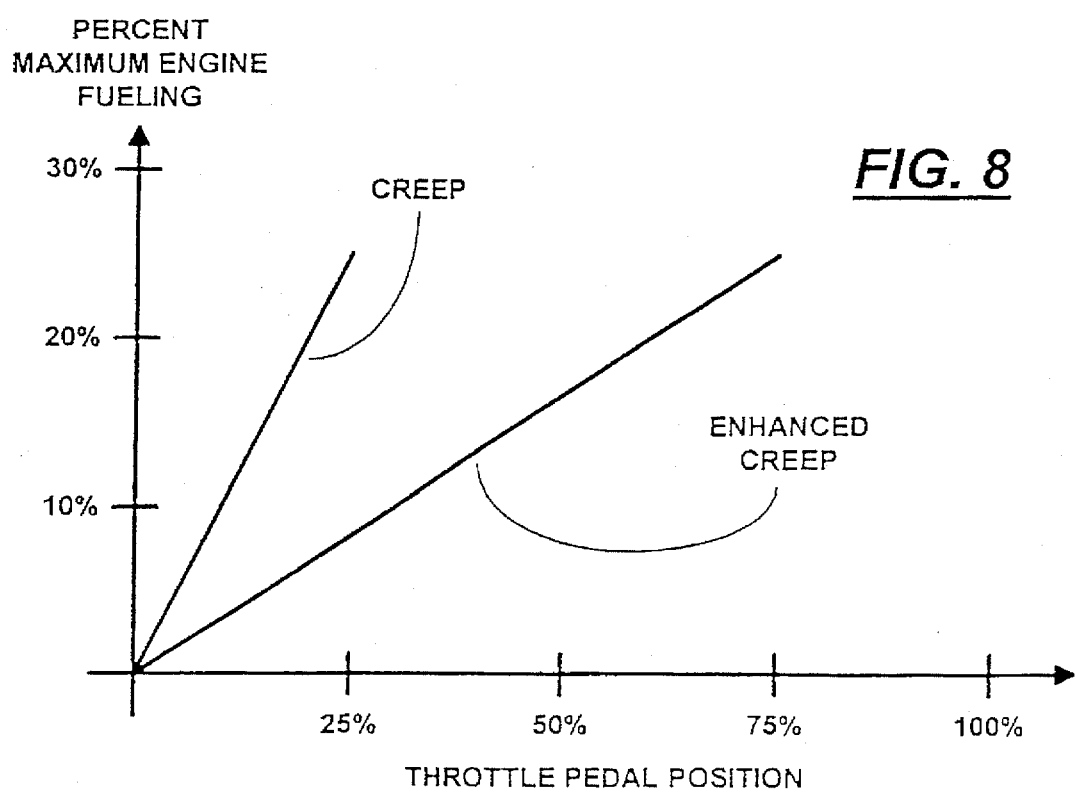
FIG. 8 is a graphic illustration of engine fueling provided by the throttle filter in the creep and enhanced creep modes of control.

Enhanced creep mode. In accordance with the present invention, to provide enhanced low-speed vehicle maneuverability in vehicles equipped with automated start-from-stop clutch controls, an operator-selectable, Enhanced Creep Mode is provided. Preferably, as will be described in greater detail below, the Enhanced Creep Mode is selectable as a pseudo gear ratio utilizing the gear shift selector 40. The Enhanced Creep Mode provides a mode of clutch control substantially identical to that attained in the Creep Mode, except that the degree of clutch engagement and the fueling of the engine is controlled over a much greater range of throttle pedal movement. As may be seen by reference to FIGS. 7 and 8, in the Enhanced Creep Mode, clutch slip ((ES−IS)÷ES) will vary from 100% to 0% inversely proportional to throttle pedal movement from 0% to 75%, rather than from 0% to 25% of throttle pedal movement when compared to the Creep Mode. Also, the fueling of the engine will vary from 0% fueling (i.e., that fueling necessary to maintain engine idling) to a maximum Creep Mode fueling (about 25% of wide-open throttle fueling) directly proportional to throttle pedal position from 0% to 75% in the Enhanced Mode, as compared to directly proportional from 0% to 25% of throttle pedal position in the standard creep mode. Accordingly, by selecting operation in the Enhanced Creep Mode, the driver is provided with a greater degree of controllability for maneuvering of the vehicle at low-speed operation. By way of example, similar to the operation in the standard Creep Mode, in the Enhanced Creep Mode, the clutch will be caused to slip such that input shaft speed will equal engine speed multiplied by the throttle pedal position (T) divided by the reference throttle pedal position ($T_{REF}$), which is the throttle pedal position at the threshold value (in this example, 75%). Similarly, the engine will be fueled in an EXTENDED DIRECT STATE in accordance with the throttle pedal signal divided by the throttle pedal signal at the reference value.

Figure 4:
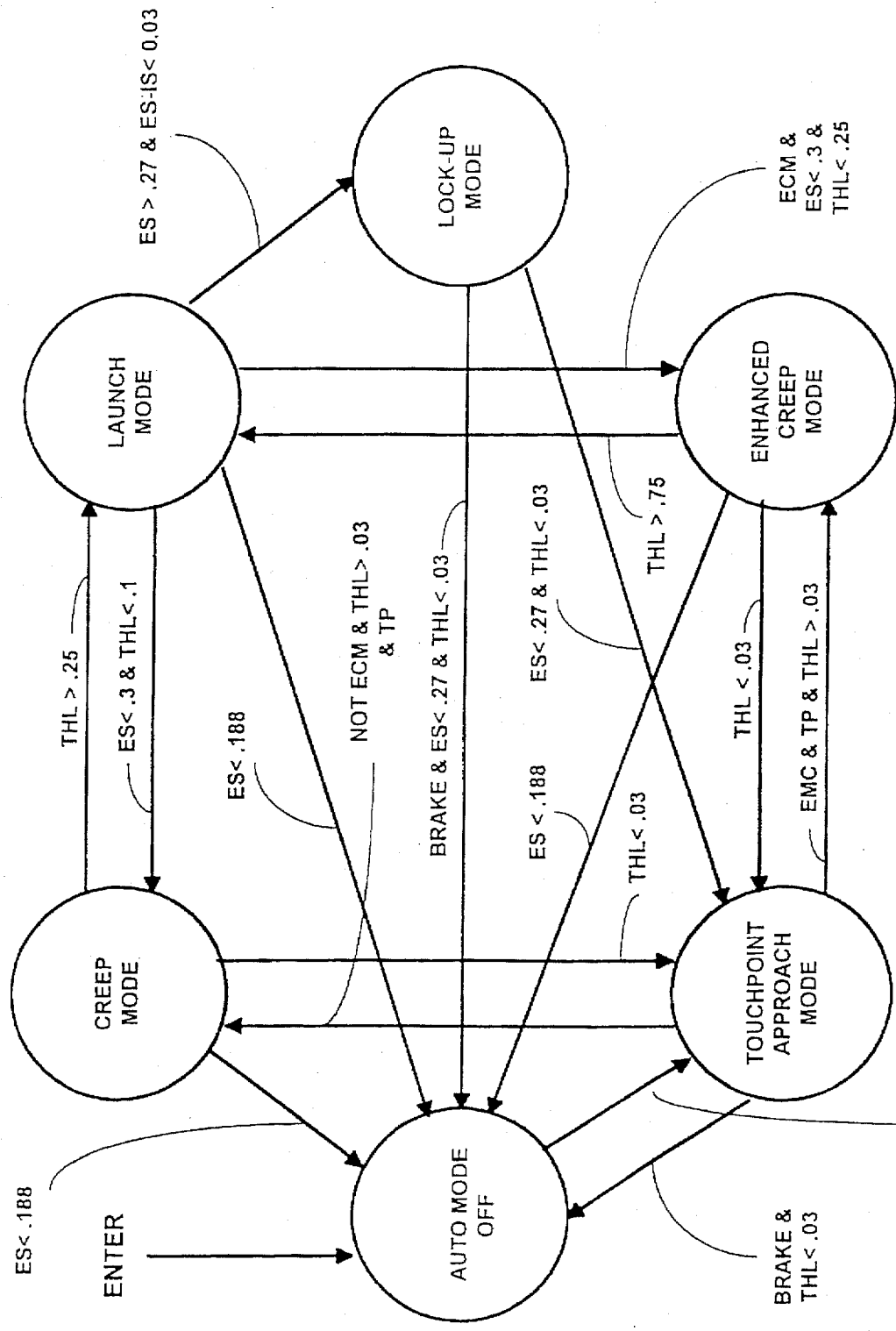
FIG. 4 is a bubble logic diagram for the clutch control logic of FIG. 3.

The bubble diagram in FIG. 4 illustrates the clutch mode control logic. Specific numbers are given in the diagram as an example applicable to a particular engine/transmission combination, and it is understood that other numbers are appropriate in other applications. Each number refers to the decimal fraction of full-scale or maximum value of the parameter indicated. For example, 0.25 or 25% of full pedal movement is selected as the ceiling of the Creep Mode and the beginning of the Launch Mode. Engine idle speed is 0.25 (thus, the value 0.27 is chosen to represent a certain speed above idle, and an engine speed less than 0.188 is approaching a stall condition). Also, to be sure that a low throttle signal is intentional, it is required that the system shall treat any throttle pedal value less than 3% or 0.03 as a zero throttle signal. It also is understood that a zero control signal to the fuel controller 34 will result in the engine begin fueled to maintain the idle speed thereof.

The bubble diagram of FIG. 4 is entered in the Auto Mode Off condition, and when throttle pedal signal exceeds 0.03, the Touch Point Approach Mode is activated. When in Touch Point Approach Mode, if the pedal signal drops below 00.03 and the brake is applied, the mode returns to Auto Mode Off. From Touch Point Approach, no action occurs until the touch point occurs and the throttle signal is greater than 3%, and then, assuming the Enhanced Creep Mode has not been selected, the Creep Mode is activated. If engine speed approaches a stall condition, the logic returns to Auto Mode Off, or if the pedal signal drops below 3%, it returns to the Touch Point Approach Mode. Normally, the controller stays in the Creep Mode for small pedal signals, but if the throttle pedal signal (THL) exceeds 25%, the Launch Mode is entered. If the engine speed becomes less than 0.3 and the pedal signal is less than 0.1, the Creep Mode is reentered. If the engine speed nears stall, the logic returns to Auto Mode Off. However, in the case of a successful clutch engagement, the clutch slip becomes small (ES−IS is less than 0.03), and if the engine speed remains above idle, the Lock-up Mode is entered. The controller will remain in the Lock-up Mode unless the pedal is released and the engine speed drops below its above-idle point, then it will go to the Touch Point Approach Mode. If the brake signal is present in addition to the pedal release and the engine speed dropping below the idle point, the controller will go to the Auto Mode Off. If the Enhanced Creep Mode ("ECM") has been manually selected by the operator, upon achieving touch point and the throttle signal remaining above 0.03, the Enhanced Creep Mode will be activated. While in the Enhanced Creep Mode, if the throttle signal drops below 0.03, the logic will return to the Touch Point Approach Mode, or if the throttle position exceeds the reference throttle (75% of throttle position), then the Launch Mode will be entered. While in the Launch Mode, if the Enhanced Creep Mode has remained selected, engine speed drops to below 0.3, and the throttle signal drops to less than 0.25, the Enhanced Creep Mode will be reactivated.

Figure 5A:
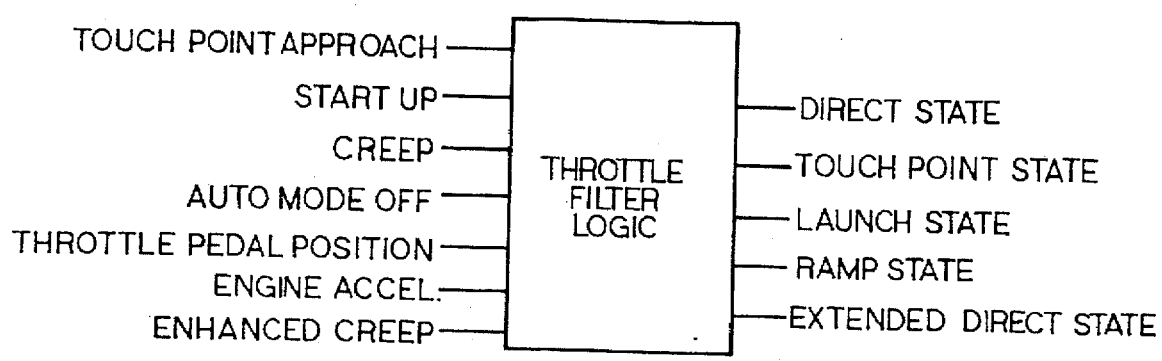
FIG. 5A is a diagram of a throttle filter logic block showing the inputs and outputs.
Figure 6:
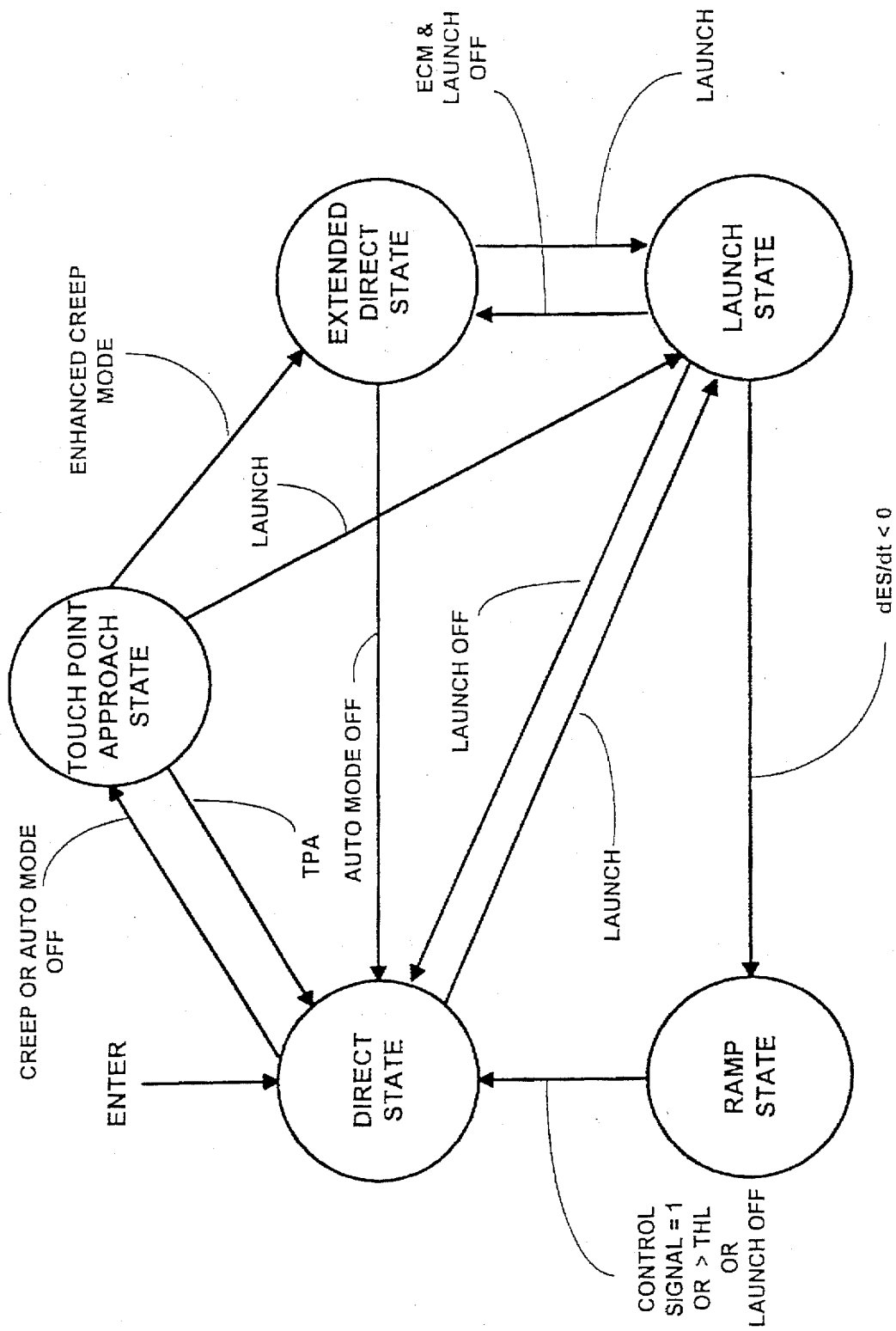
FIG. 6 is a bubble logic diagram for the throttle filter logic of FIG. 5A.

The block diagram for the throttle filter logic is shown in FIG. 5A. It is understood that this logic may be modified to be compatible with various electronic engine controls and electronic vehicle data links, such as the data links defined by the SAE J1922, SAE J1939 and/or ISO 11898 protocols. In the logic illustrated, the inputs for the fuel control logic are five of the clutch control modes (Touch Point Approach, Launch, Creep, Enhanced Creep and Auto Mode Off), as well as throttle pedal position and engine acceleration. The outputs are five throttle logic states (Direct, Touch Point, Launch, Ramp and Extended Direct). The engine control signal function for each state is defined in the table illustrated in FIG. 5B. The bubble logic diagram of FIG. 6 illustrates the throttle filter logic and is entered into in the Direct State and returns to the Direct State when the control signal reaches its maximum value or exceeds the pedal signal or the Launch Mode turns off.

Figure 9A:
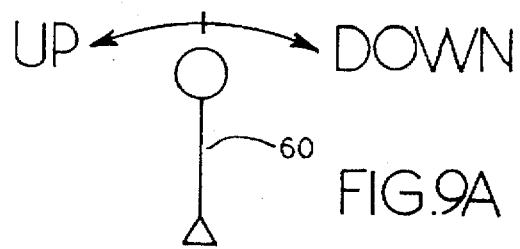
FIGS. 9A–9D are illustrative of shift selection devices allowing manual selection of the enhanced creep mode of operation.
Figure 9B:
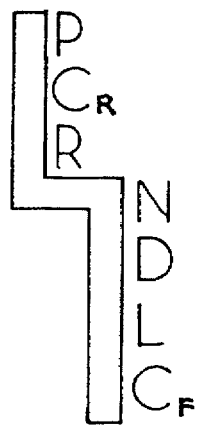
Figure 9C:
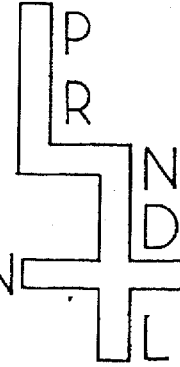
Figure 9D:
Figure 9D:
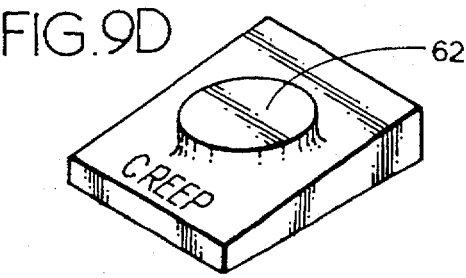

FIGS. 9A–9D illustrate various selector patterns for the manually operated shift selector 40, allowing the operator to manually select operation in the Extended Creep Control Mode, preferably allowing selection as a pseudo gear ratio. FIG. 9A illustrates a transmission of the type having a manually operated selector lever 60, which may be moved in an upshift or downshift direction from the normally centered position thereof for selection of single or multiple upshifts or downshifts, respectively, from the currently engaged ratio. Transmissions of this general type are known in the prior art and may be seen by reference to aforementioned U.S. Pat. No. 4,648,290. As may be seen, in such a system, the transmission may be downshifted from first gear and upshifted from neutral to select the forward creep ratio ($C_F$), or downshifted from neutral and upshifted from reverse to select the reverse creep ratio ($C_R$) as a pseudo gear selection. FIG. 9B illustrates an automatic shift selection pattern of the general "P-R-N-D-L" type, having additional positions for selection of the forward and reverse enhanced creep modes. FIG. 9C illustrates a shift pattern similar to FIG. 9B, except that the drive position allows movement of the shift selection device rightwardly to select upshifts and leftwardly to select downshifts. In this case, the forward creep ratio is a downshift from first gear, while the reverse creep ratio is a ratio interposed between regular reverse and neutral. FIG. 9D illustrates an alternate control wherein the enhanced creep ratio is selected by an independent selection device, such as a lighted pushbutton 62 or the like. In systems of this type, preferably, "creep" may be selected only in conjunction with operation in the lowest available forward or reverse gear ratio.

Accordingly, it may be seen that the present invention provides an operator-selectable, Enhanced Creep Control Mode of operation for vehicles equipped with an automated clutch control, which will allow enhanced operator control of vehicle slow-speed operations and slow-speed maneuvering of vehicles. The control of the present invention may be advantageously used in connection with many types of automated clutch control systems, including the type illustrated in aforementioned U.S. Pat. No. 5,314,050.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for clutch control in a vehicle having a fuel-controlled internal combustion engine, a fuel controller for controlling fueling of the engine, a manually controlled throttle displaceable between 0% and 100% displaced positions, a multiple-speed transmission having an input shaft, a master friction clutch drivingly interposed between the engine and the transmission input shaft, a clutch actuator for causing the clutch to be fully engaged, fully disengaged or partially engaged, a manual selector for selecting operation in a creep mode, and a controller for receiving input signals including signals indicative of engaged transmission ratio (GR), engine rotational speed (ES), input shaft rotational speed (IS), throttle displacement (THL) and selector operation (ECCM=0 or 1) and for processing same in accordance with programmed logic rules to issue command output signals to system actuators including said fuel controller and said clutch actuator, said method comprising:

causing operation in an enhanced creep control mode upon sensing (i) manual selection of operation in a creep mode (ECCM=1), (ii) operation in a low transmission ratio, and (iii) throttle displacement less than an enhanced creep control mode throttle reference value ($T_{ECCM}$) equal to at least 50% displacement.

2. The method of claim 1 wherein said enhanced creep control mode throttle reference value is equal to at least 70% displacement.

3. The method of claim 1 wherein said enhanced creep control mode throttle reference value is about 75% displacement.

4. The method of claims 1, 2 or 3 wherein operation in said enhanced creep control mode additionally requires sensing that (iv) throttle displacement is equal to at least a minimum value equal to about 3% displacement.

5. The method of claim 4 wherein operation in said enhanced creep control mode additionally requires sensing that (v) the clutch be engaged at least to the touch point.

6. The method of claims 1, 2 or 3 wherein operation in said enhanced creep control mode additionally requires sensing that (v) the clutch be engaged at least to the touch point.

7. The method of claims 1, 2 or 3 wherein said throttle is a throttle pedal.

8. The method of claims 1, 2 or 3 wherein operation in said enhanced creep control mode comprises causing engine fueling to increase from idle fueling (0%) to a creep control maximum fueling value, equal to about 20% to 30% of maximum engine fueling, with increased throttle displacement from about 0% displacement to the enhanced creep control mode reference value ($T_{ECCM}$).

9. The method of claim 8 wherein engine fueling is increased substantially proportionally to increases in throttle positions between about 0% displacement and said enhanced creep control mode reference value.

10. The method of claim 8 wherein said selector is a transmission mode selector and selection of operation in a creep mode comprises selection of creep ratio or position.

11. The method of claims 1, 2 or 3 wherein operation in said enhanced creep control mode comprises causing the clutch to engage such that slip ((ES−IS)÷ES) decreases from about 100% to a minimum value equal to less than 10% with increased throttle displacement from about 0% displacement to the enhanced creep control mode reference value.

12. The method of claim 11 wherein slip is caused to decrease substantially proportionally to increases in throttle position between about 0% displacement and said enhanced creep control mode reference value.

13. The method of claim 11 wherein said transmission has a lowest ratio in one of the forward and reverse directions of operation, said command output signals control a transmission operator and operation in said enhanced creep control mode further comprises causing said transmission to operate in said lowest ratio.

14. The method of claim 11 wherein said selector is a transmission mode selector and selection of operation in a creep mode comprises selection of creep ratio or position.

15. The method of claims 1, 2 or 3 wherein said selector is a transmission mode selector and selection of operation in a creep mode comprises selection of creep ratio or position.

16. The method of claims 1, 2 or 3 wherein said controller causes operation in a non-enhanced creep mode upon sensing creep mode not manually selected, throttle position is less than a non-enhanced creep mode throttle reference value ($T_{CCM}$) equal to about 25% throttle displacement, and operation in a low transmission ratio.

17. A computer-based controller (20) for clutch control in a vehicle having a fuel-controlled internal combustion engine (12), a fuel controller (34) for controlling fueling of the engine, a manually controlled throttle (32) displaceable between 0% and 100% displaced positions, a multiple-speed mechanical transmission (16) having an input shaft (44), a master friction clutch (14) drivingly interposed between the engine and the transmission input shaft, a clutch actuator (36) for causing the clutch to be fully engaged, fully disengaged or partially engaged, and a manual selector (40) for selecting operation in a creep mode, said controller comprising:

input signal receiving means for receiving input signals (22) including signals indicative of engaged transmission ratio (GR), engine rotational speed (ES), input shaft rotational speed (IS), throttle displacement (THL) and selector operation (ECCM=0 or 1); and processing means for processing said input signals in accordance with logic rules to issue command output signals (24) to system actuators including said fuel controller and said clutch actuator, said controller characterized by logic rules:

causing operation in an enhanced creep control mode upon sensing (i) operation in a low transmission ratio, (ii) manual selection of operation in a creep mode (ECCM=1) and (iii) throttle displacement less than an enhanced creep control mode throttle reference value ($T_{ECCM}$) equal to at least 50% displacement.

18. The controller of claim 17 wherein said enhanced creep control mode throttle reference value is equal to at least 70% displacement.

19. The controller of claim 17 wherein said enhanced creep control mode throttle reference is about 75% displacement.

20. A vehicular automated mechanical transmission system (10) including a fuel-controlled internal combustion engine (12), a fuel controller (34) for controlling fueling of the engine a manually controlled throttle (32) displaceable between 0% and 100% displaced positions, a multiple-speed mechanical transmission (16) having an input shaft, said transmission having a lowest ratio in the forward direction of rotation, a transmission operator (38) for controlling shifting of the transmission, a master friction clutch (14) drivingly interposed between the engine and the transmission input shaft, a clutch actuator (36) for causing the clutch to be fully engaged, fully disengaged or partially engaged, a manual selector (40) for selecting operation in a creep mode, and a controller (20) for receiving input signals including signals indicative of engaged gear ratio (GR), engine rotational speed (ES), input shaft rotational speed (IS), throttle displacement (THL) and selector operation (ECCM=0 or 1) and for processing same in accordance with programmed logic rules to issue command output signals to system actuators including said fuel controller, said transmission operator and said clutch actuator, said system characterized by said logic rules including rules:

causing operation in an enhanced creep control mode upon sensing (i) manual selection of operation in a creep mode (ECCM=1), (ii) operation in a low transmission ratio, and (iii) throttle displacement less than an enhanced creep control mode throttle reference value ($T_{ECCM}$) equal to about 50% displacement.

21. The system of claim 20 wherein said enhanced creep control mode throttle reference value is equal to at least 70% displacement.

22. The system of claim 20 wherein said enhanced creep control mode throttle reference value is about 75% displacement.

23. The system of claims 20, 21 or 22 wherein operation in said enhanced creep control mode additionally requires sensing that (iv) throttle position is equal at least a minimum throttle value equal to about 3% displacement.

24. The system of claim 23 wherein operation in said enhanced creep control mode additionally requires sensing that (v) the clutch be engaged at least to the touch point.

25. The system of claims 20, 21 or 22 wherein operation in said enhanced creep control mode additionally requires sensing that (v) the clutch be engaged at least to the touch point.

26. The system of claims 20, 21 or 22 wherein operation in said enhanced creep control mode comprises causing engine fueling to increase from idle fueling (0%) to a creep control maximum fueling value equal to about 20% to 30% of maximum engine fueling with increased throttle displacement from about 0% displacement to the enhanced creep control mode reference value ($T_{ECCM}$).

* * * * *